United States Patent
Higuchi et al.

(10) Patent No.: US 11,213,813 B2
(45) Date of Patent: *Jan. 4, 2022

(54) DROPLET DISPENSING APPARATUS

(71) Applicant: TOSHIBA TEC KABUSHIKI KAISHA, Tokyo (JP)

(72) Inventors: Masaaki Higuchi, Yokohama Kanagawa (JP); Satoshi Kaiho, Yokohama Kanagawa (JP); Ryutaro Kusunoki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 945 days.

This patent is subject to a terminal disclaimer.

(21) Appl. No.: 15/891,166

(22) Filed: Feb. 7, 2018

(65) Prior Publication Data

US 2018/0272334 A1 Sep. 27, 2018

(30) Foreign Application Priority Data

Mar. 24, 2017 (JP) .............................. JP2017-059798

(51) Int. Cl.
*B01L 3/02* (2006.01)
*G01N 35/10* (2006.01)

(52) U.S. Cl.
CPC ........... *B01L 3/0241* (2013.01); *B01L 3/0268* (2013.01); *B01L 3/0237* (2013.01);
(Continued)

(58) Field of Classification Search
None
See application file for complete search history.

(56) References Cited

U.S. PATENT DOCUMENTS 5,508,200 A * 4/1996 Tiffany ............... B01J 19/0046
422/66
6,447,723 B1 * 9/2002 Schermer ............ B01J 19/0046
382/129
(Continued)

FOREIGN PATENT DOCUMENTS

CN 106391362 A 2/2017
JP 2002139370 A 5/2002
(Continued)

OTHER PUBLICATIONS

Japanese Office Action dated Jan. 5, 2021, mailed in counterpart Japanese Application No. 2017-059798, 7 pages (with translation).
(Continued)

*Primary Examiner* — Brian R Gordon
(74) *Attorney, Agent, or Firm* — Kim & Stewart LLP

(57) ABSTRACT

According to one embodiment, a droplet dispensing apparatus include a droplet ejecting array having a plurality of nozzles from which solution can be ejected into a microplate on a baseplate, a sensor configured to detect a solution amount in the microplate, and a controller configured to detect that a nozzle in the plurality of nozzles is malfunctioning during a solution ejection process based on an initial solution amount in the microplate and a final solution amount in the microplate as detected by the sensor, and control a supplemental droplet dispensing operation in which an additional solution amount is ejected into the microplate based on the initial solution amount and the final solution amount in the microplate.

20 Claims, 13 Drawing Sheets

(52) U.S. Cl.
CPC . *B01L 2200/0605* (2013.01); *B01L 2200/143* (2013.01); *G01N 2035/1041* (2013.01)

(56) References Cited

U.S. PATENT DOCUMENTS

| | | | |
|---|---|---|---|
| 2002/0096577 A1 | 7/2002 | Takeuchi et al. | |
| 2003/0087442 A1* | 5/2003 | Popa-Burke | G01N 35/0099 506/33 |
| 2003/0134033 A1* | 7/2003 | Holguin | B01L 3/505 427/8 |
| 2003/0146742 A1* | 8/2003 | Nishida | B41J 2/04595 324/76.11 |
| 2003/0215360 A1* | 11/2003 | Ruddock | G01N 35/0099 422/63 |
| 2003/0234826 A1* | 12/2003 | Hosono | B41J 2/04551 347/10 |
| 2004/0079768 A1* | 4/2004 | Kiguchi | B41J 2/04506 222/420 |
| 2004/0113960 A1* | 6/2004 | Usui | B41J 2/04596 347/10 |
| 2004/0171171 A1* | 9/2004 | Appoldt | G01G 23/3728 436/180 |
| 2005/0200639 A1* | 9/2005 | Kobayashi | B41J 2/04591 347/10 |
| 2007/0006942 A1* | 1/2007 | Pluvinage | B01L 3/021 141/83 |
| 2008/0088663 A1* | 4/2008 | Kojima | B41J 2/0456 347/19 |
| 2008/0129770 A1* | 6/2008 | Mizugaki | B41J 2/04573 347/10 |
| 2008/0138499 A1* | 6/2008 | Hiruma | B41J 2/04581 427/8 |
| 2008/0174627 A1* | 7/2008 | Kamiyama | B41J 2/04598 347/17 |
| 2008/0261326 A1* | 10/2008 | Dudenhoefer | B01L 3/0268 436/174 |
| 2008/0262651 A1* | 10/2008 | Luechinger | G06Q 10/087 700/240 |
| 2009/0008159 A1* | 1/2009 | Yamamoto | G01G 17/06 177/180 |
| 2009/0032064 A1* | 2/2009 | Gifford | B08B 3/044 134/18 |
| 2009/0117261 A1* | 5/2009 | Sakai | B41J 2/04541 427/66 |
| 2009/0168056 A1* | 7/2009 | Nakamura | G01N 21/94 356/237.4 |
| 2009/0203544 A1 | 8/2009 | Pierik et al. | |
| 2009/0295858 A1* | 12/2009 | Ito | B41J 2/04581 347/17 |
| 2009/0303274 A1* | 12/2009 | Iwata | B41J 2/04581 347/17 |
| 2009/0303275 A1* | 12/2009 | Ito | B41J 2/1645 347/17 |
| 2010/0238215 A1* | 9/2010 | Kusunoki | B41J 2/1433 347/10 |
| 2010/0247743 A1* | 9/2010 | Komori | B41J 2/17509 427/8 |
| 2011/0143947 A1* | 6/2011 | Chamberlin | G01N 21/6452 506/7 |
| 2011/0284090 A1* | 11/2011 | Popa | B01F 15/0022 137/2 |
| 2014/0193309 A1 | 7/2014 | Still et al. | |
| 2014/0224990 A1* | 8/2014 | Stevenson | G01F 15/0755 250/338.5 |
| 2015/0090807 A1* | 4/2015 | Yamaguchi | B05B 17/00 239/63 |
| 2015/0140669 A1* | 5/2015 | Boehm | G01F 11/021 436/54 |
| 2015/0253223 A1* | 9/2015 | Foster | G01N 1/31 435/30 |
| 2016/0045912 A1* | 2/2016 | Luebbert | B01L 3/021 73/864.01 |
| 2016/0045918 A1* | 2/2016 | Lapham | G01N 1/38 506/23 |
| 2016/0252386 A1* | 9/2016 | Baumfalk | G01N 9/26 177/1 |
| 2016/0279630 A1* | 9/2016 | Fracchia | B01L 3/0217 |
| 2016/0375686 A1 | 12/2016 | Yokoyama et al. | |
| 2017/0072683 A1 | 3/2017 | Sakai | |
| 2017/0165969 A1 | 6/2017 | Yokoyama et al. | |
| 2017/0322068 A1* | 11/2017 | Gueller | G01G 17/06 |
| 2018/0059130 A1* | 3/2018 | Iwashita | G01N 35/1016 |
| 2018/0100757 A1* | 4/2018 | Tiemens | G01F 25/0092 |
| 2018/0272335 A1 | 9/2018 | Higuchi et al. | |
| 2019/0376996 A1* | 12/2019 | Wang | G01N 35/1002 |
| 2020/0079542 A1* | 3/2020 | Visinoni | B65B 31/028 |
| 2020/0209273 A1* | 7/2020 | Ota | G01N 35/1011 |
| 2020/0348324 A1* | 11/2020 | Wikholm | B01L 9/06 |
| 2020/0371012 A1* | 11/2020 | Barnes | G01N 35/10 |
| 2021/0106985 A1* | 4/2021 | Tajima | B01L 3/0217 |

FOREIGN PATENT DOCUMENTS

| | | |
|---|---|---|
| JP | 2002273308 A | 9/2002 |
| JP | 2003322630 A | 11/2003 |
| JP | 2004361234 A | 12/2004 |
| JP | 2009543042 A | 12/2009 |
| JP | 2011131145 A | 7/2011 |
| JP | 2016022416 A | 2/2016 |
| JP | 2017015466 A | 1/2017 |
| JP | 2017056402 A | 3/2017 |

OTHER PUBLICATIONS

U.S. Appl. No. 15/694,974, filed Sep. 4, 2017 (First inventor: Shuhei Yokoyama).
U.S. Appl. No. 15/685,949, filed Aug. 24, 2017 (First inventor: Shuhei Yokoyama).
U.S. Appl. No. 15/685,891, filed Aug. 24, 2017 (Frst inventor: Shuhei Yokoyama).
U.S. Appl. No. 15/684,883, filed Aug. 23, 2017 (First inventor: Shuhei Yokoyama).
U.S. Appl. No. 15/684,643, filed Aug. 23, 2017 (First inventor: Shuhei Yokoyama).
U.S. Appl. No. 15/683,574, filed Aug. 22, 2017 (First inventor: Shuhei Yokoyama).
Extended European Search Report dated Jun. 6, 2018, mailed in counterpart European Application No. 18159396.3, 10 pages.

* cited by examiner

DROPLET DISPENSING APPARATUS

CROSS-REFERENCE TO RELATED APPLICATION

This application is based upon and claims the benefit of priority from Japanese Patent Application No. 2017-059798, filed Mar. 24, 2017, the entire contents of which are incorporated herein by reference.

FIELD

Embodiments described herein relate generally to a droplet dispensing apparatus.

BACKGROUND

For use in biological and pharmaceutical research and development, medical diagnosis or testing, or agricultural experimentation, analytic devices and testing methods involving dispensing solution in volumes in a picoliter (pL) to microliter (µL) range are often used.

For improved speed in testing and evaluation, a droplet ejection device typically ejects liquid droplets simultaneously from multiple nozzles into wells of a microplate (also referred to as a multi-well plate) or the like.

When liquid droplets are being dispensed simultaneously from a plurality of nozzles, there is a possibility that some of nozzles may not discharge the liquid as intended. In such a case, the intended amount of liquid is not dispensed from malfunctioning nozzle, which may cause erroneous evaluation results in some testing applications.

DETAILED DESCRIPTION

In general, according to one embodiment, a droplet dispensing apparatus include a droplet ejecting array having a plurality of nozzles from which solution can be ejected into a microplate on a baseplate, a sensor configured to detect a solution amount in the microplate, and a controller configured to detect that a nozzle in the plurality of nozzles is malfunctioning during a solution ejection process based on an initial solution amount in the microplate and a final solution amount in the microplate as detected by the sensor, and control a supplemental droplet dispensing operation in which an additional solution amount is ejected into the microplate based on the initial solution amount and the final solution amount in the microplate.

Hereinafter, droplet dispensing apparatuses according to example embodiments will be described with reference to the drawings. It should be noted, that the particular embodiments explained below are some possible examples of a droplet dispensing apparatus according to the present disclosure and do not limit the possible configurations, specifications, or the like of droplet dispensing apparatuses according to the present disclosure.

First Embodiment

Figure 1:
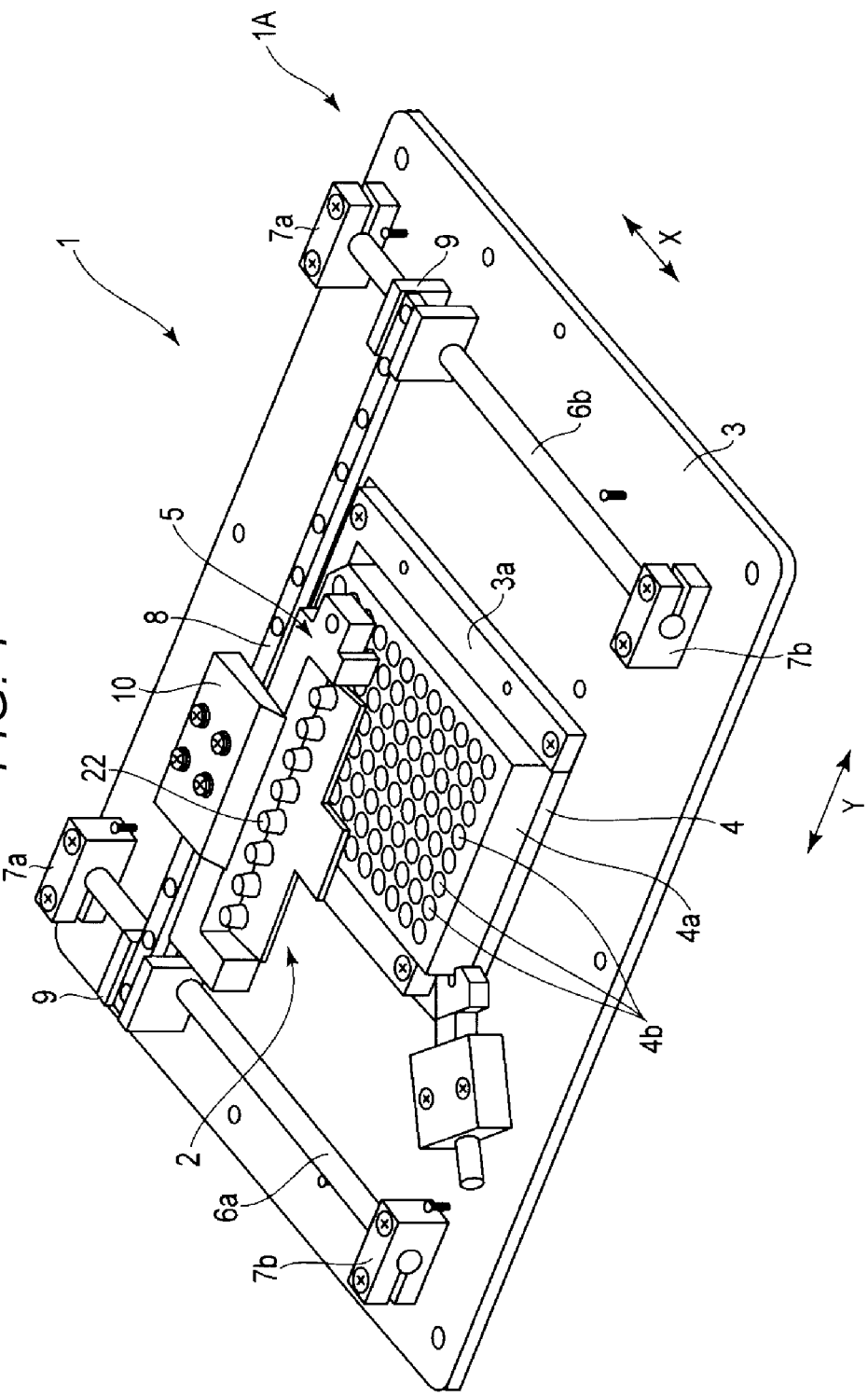
FIG. 1 is a perspective view of a droplet dispensing apparatus according to a first embodiment.
Figure 2:
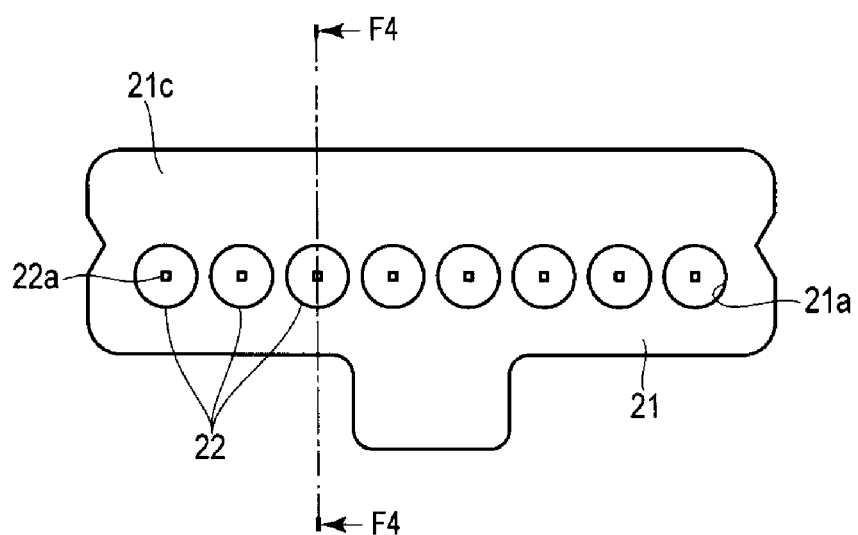
FIG. 2 is a top view of a droplet ejecting device of a droplet dispensing apparatus.
Figure 3:
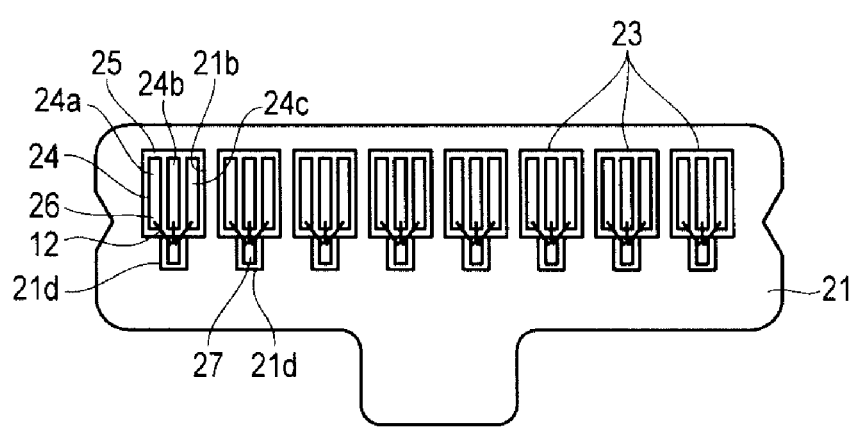
FIG. 3 is a bottom view of a droplet ejecting device of the droplet dispensing apparatus.
Figure 4:
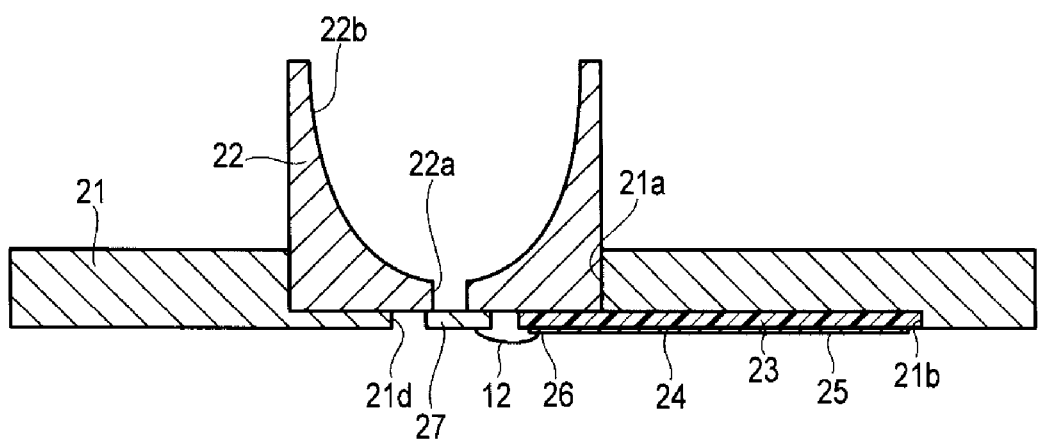
FIG. 4 is a cross-sectional view taken along line F4-F4 in FIG. 2.
Figure 5:
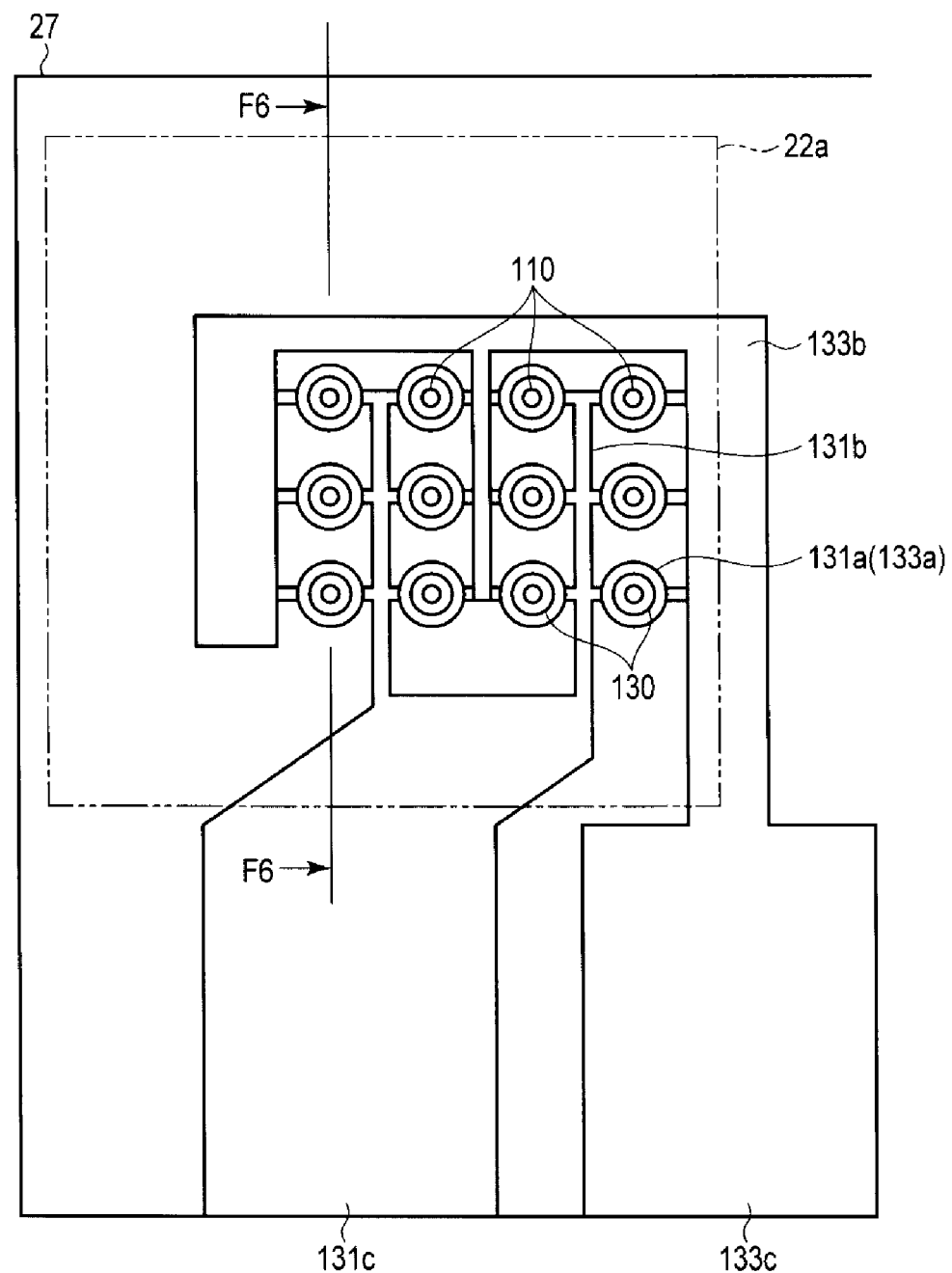
FIG. 5 is a plan view of a droplet ejecting array of a droplet ejecting device.
Figure 6:
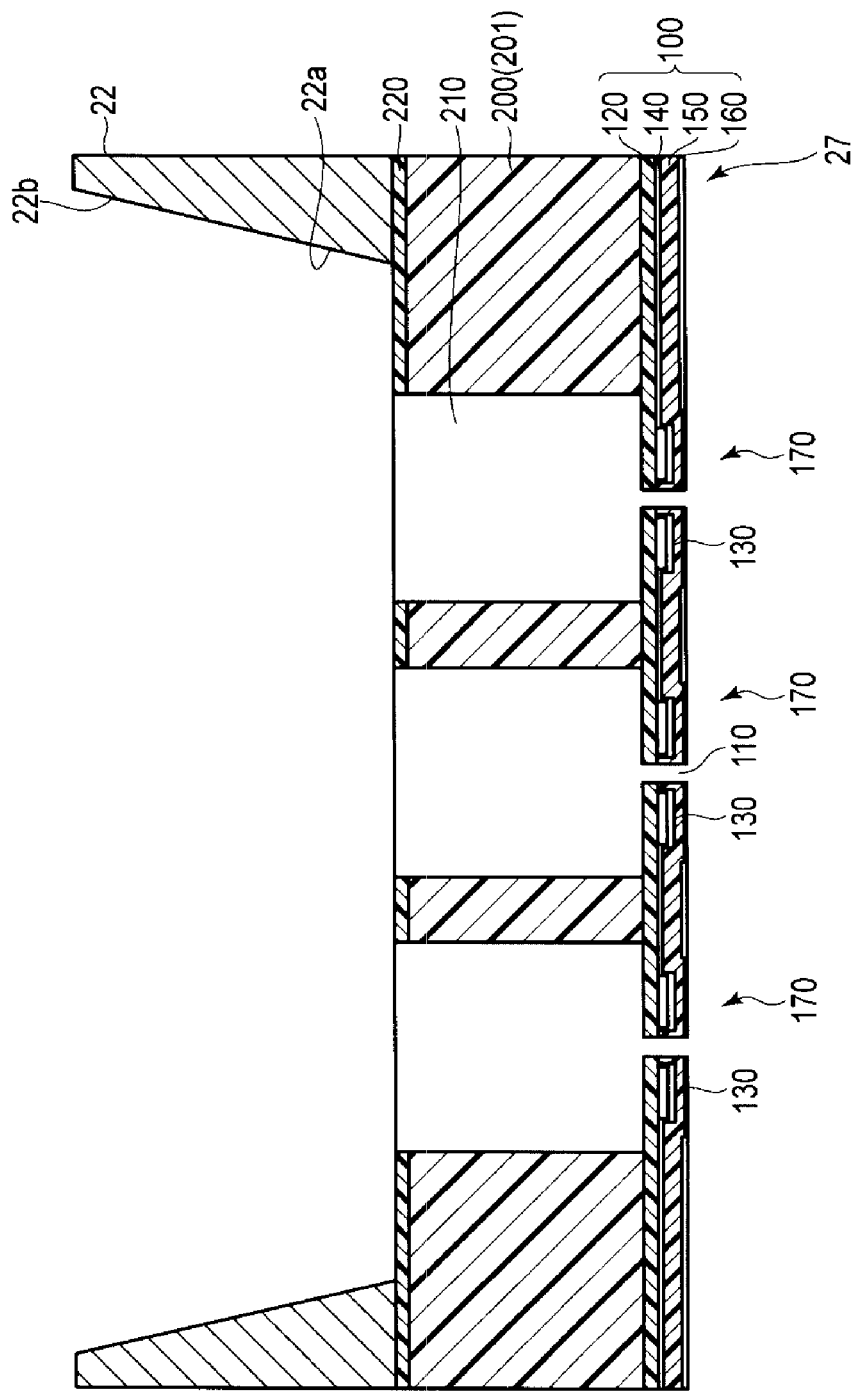
FIG. 6 is a cross-sectional view taken along line F6-F6 in FIG. 5.
Figure 7:
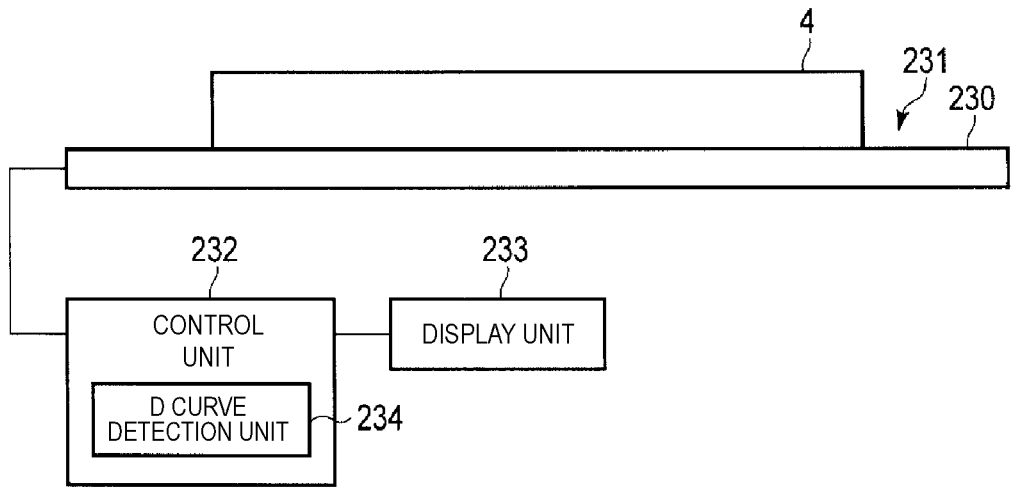
FIG. 7 is a schematic diagram of a non-ejection state detection unit of a droplet dispensing apparatus.
Figure 8:
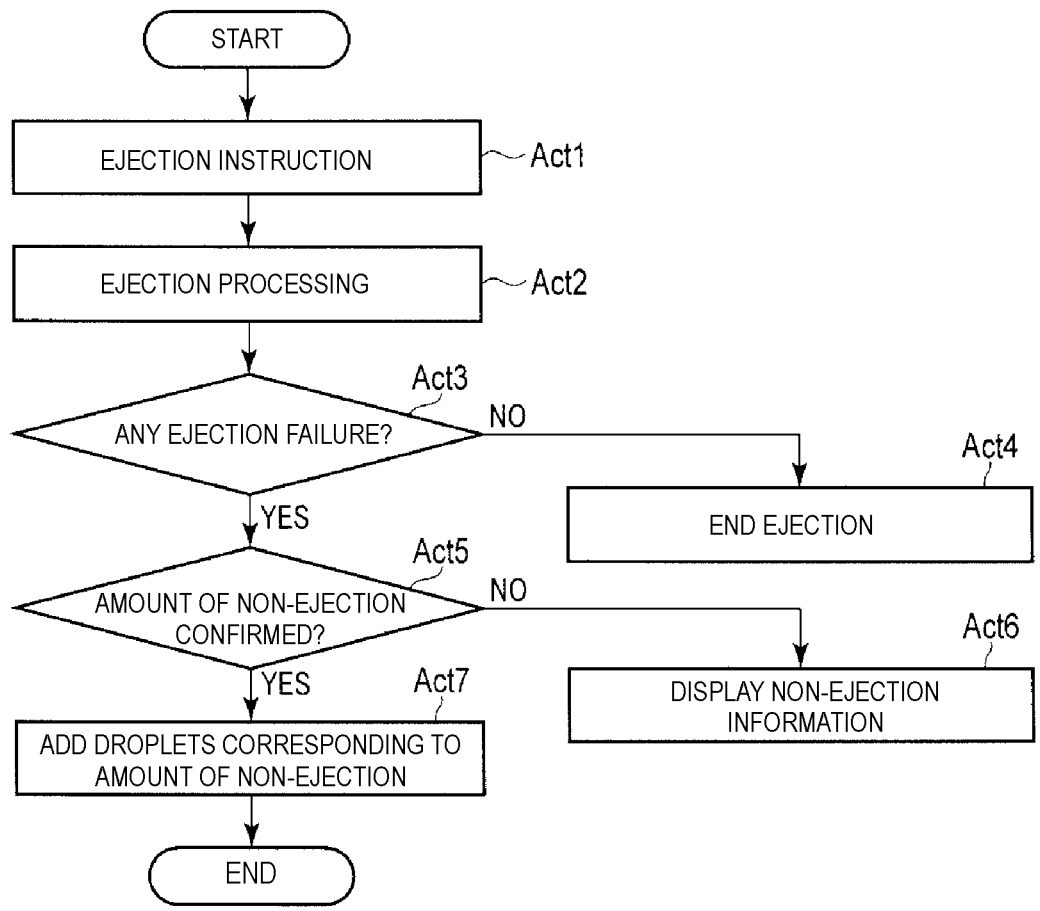
FIG. 8 is a flowchart of ejection processing in which solution droplets are dropped from a droplet ejecting unit of a droplet dispensing apparatus onto a microplate.
Figure 9:
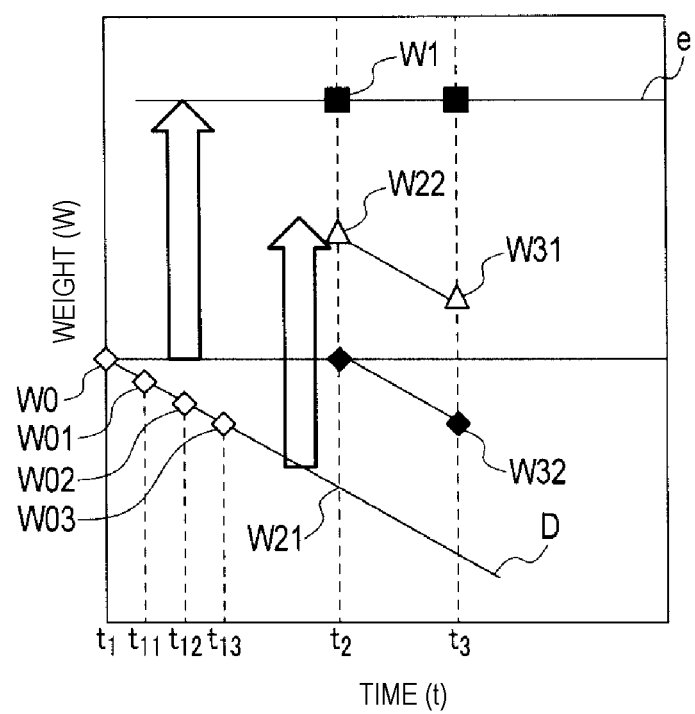
FIG. 9 is a diagram for explaining an actual measurement curve in a case where drying occurs in a microplate.
Figure 10:
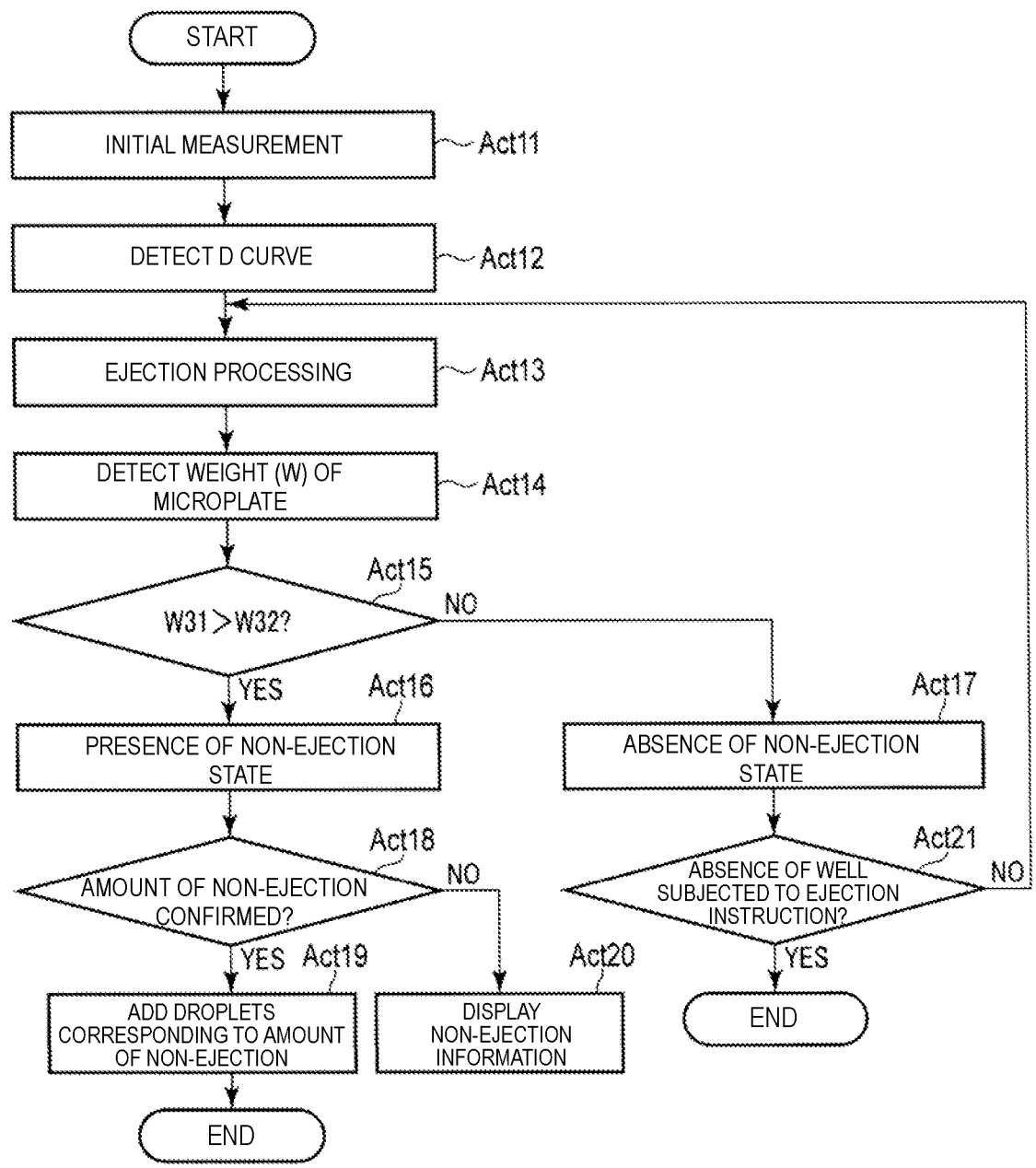
FIG. 10 is a flowchart illustrating an operation of a non-ejection state detection unit of the droplet dispensing apparatus according to the first embodiment.

An example of a droplet dispensing apparatus 1 according to a first embodiment is described with reference to FIG. 1 through FIG. 10. FIG. 1 is a perspective view of the droplet dispensing apparatus 1 according to the first embodiment. FIG. 2 is a top view of a droplet ejecting device 2, which is mounted in the droplet dispensing apparatus 1. FIG. 3 is a bottom view a surface of the droplet ejecting device 2 from which droplets are discharged. FIG. 4 is a cross-sectional view taken along line F4-F4 in FIG. 2. FIG. 5 is a plan view of a droplet ejecting array 27 of the droplet ejecting device 2. FIG. 6 is a cross-sectional view taken along line F6-F6 in FIG. 5. FIG. 7 is a schematic diagram of a non-ejection state detection unit of the droplet dispensing apparatus 1. FIG. 8 is a flowchart of ejection processing in which solution droplets are dropped from a droplet ejecting unit of the droplet dispensing apparatus 1 onto a microplate. FIG. 9 is a diagram for explaining an actual measurement curve in a case where drying occurs in the microplate. FIG. 10 is a flowchart illustrating an operation of the non-ejection state detection unit of the droplet dispensing apparatus 1 according to the first embodiment.

The droplet dispensing apparatus 1 has a main body 1A, which includes a baseplate 3 of the rectangular plate shape and a mounting module 5. In the present embodiment, a microplate 4, which may also be referred to as a receiving portion, a multiwell plate, or a microwell plate in some contexts, has 96 wells into which a solution can be dispensed. Microplates having 96 wells are commonly used in a biochemistry research and clinical examination. However, the microplate 4 is not limited to having 96 wells and may have any other number of wells, such as 384 wells, 1536 wells, 3456 wells, or 6144 wells.

The microplate 4 is located at a central position of the baseplate 3 and can be secured to and detached from a plate attaching portion 3a of the baseplate 3. A pair of X-direction guide rails 6a and 6b extending in the X-direction is provided at both sides of the microplate 4. The ends of each of the X-direction guide rails 6a and 6b are respectively fixed to fixing supports 7a and 7b protruding on the baseplate 3.

A Y-direction guide rail 8 extending in the Y-direction is provided between the X-direction guide rails 6a and 6b. Both ends of the Y-direction guide rail 8 are respectively fixed to X-direction movable supports 9 which can slide in the X-direction along the X-direction guide rails 6a and 6b.

A Y-direction movable support 10 is provided, on which the mounting module 5 is movable in the Y-direction along the Y-direction guide rail 8. The mounting module 5 is mounted on the Y-direction movable support 10. The droplet ejecting device 2, which serves as a droplet ejecting unit, is fixed to the mounting module 5. Thus, the droplet ejecting device 2 can move to any position in the X- and Y-directions, which are orthogonal to each other in this instance, by a combination of a movement of the Y-direction movable support 10 moving in the Y-direction along the Y-direction guide rail 8 and a movement of the X-direction movable supports 9 moving in the X-direction along the X-direction guide rails 6a and 6b.

The droplet ejecting device 2 according to the first embodiment has a flat base plate 21. As illustrated in FIG. 2, on a top surface of the base plate 21 eight solution holding containers 22 are arranged side by side in a line in the Y-direction. In some embodiments, the base plate 21 may have more or less than eight solution holding containers 22. Each of the solution holding containers 22 is a bottomed cylindrically-shaped container with an open top surface as illustrated in FIG. 4. On the top surface of the base plate 21, cylindrically-shaped recessed portions 21a are formed at positions corresponding to the respective solution holding containers 22. The bottom portion of each of the solution holding containers 22 is fixed to each of the recessed portions 21a. Furthermore, on the bottom portion of the solution holding container 22, a solution outlet opening 22a (referred simply to as an opening hereinafter), through which solution is ejected, is formed at the central position. An opening area of a top opening 22b is larger than an opening area of the solution outlet opening 22a.

As illustrated in FIG. 3, on a bottom surface of the base plate 21, an electrical circuit board 23 is provided at each of the solution holding containers 22. Each of the electrical circuit boards 23 is a rectangular flat plate member. On the side of the back surface of the base plate 21. As illustrated in FIG. 4, a rectangular recessed portion 21b for mounting the electrical circuit board 23 and a droplet ejecting opening 21d communicating with the recessed portion 21b are formed. Circumference of the recessed portion 21b extends from the solution holding container 22 towards an upper end of the base plate 21 (an upper end in FIG. 3 and a right end in FIG. 4). A portion of the recessed portion 21b overlaps a part of the solution holding container 22 as illustrated in FIG. 4. The electrical circuit board 23 is adhesively fixed to the recessed portion 21b.

On the electrical circuit board 23, an electrical circuit board wiring 24 is patterned on a surface opposite to the recessed portion 21b. The electrical circuit board wiring 24 has three wiring patterns 24a, 24b, and 24c formed therein, which are respectively connected to a terminal portion 131c of a lower electrode 131 and two terminal portions 133c of an upper electrode 133.

At one end portion of the electrical circuit board wiring 24, a control signal input terminal 25 for receiving an external control signal is formed. At the other end portion of the electrical circuit board wiring 24, an electrode terminal connector 26 is formed. The electrode terminal connector 26 electrically connects the lower electrode terminal portion 131c and the upper electrode terminal portions 133c formed in the droplet ejecting array 27 illustrated in FIG. 5.

Furthermore, the base plate 21 has a through-hole for the droplet ejecting opening 21d. The droplet ejecting opening 21d is a rectangular through-hole as illustrated in FIG. 3, and is formed at a position overlapping the recessed portions 21a on the side of the back surface of the base plate 21.

The droplet ejecting array 27 illustrated in FIG. 5 is adhesively fixed to the lower surface of the solution holding container 22 as to cover the solution outlet opening 22a of the solution holding container 22. The droplet ejecting array 27 is located at a position corresponding to the droplet ejecting opening 21d of the base plate 21.

As illustrated in FIG. 6, the droplet ejecting array 27 is formed by stacking a nozzle plate 100 and a pressure chamber structure 200 in layers. The nozzle plate 100 includes a nozzle 110 for discharging solution, a diaphragm 120, a drive element 130, a protective film 150, and a liquid-repellent film 160. An actuator 170 is formed with the diaphragm 120 and the drive element 130. In the present embodiment, the actuator 170 can be a piezoelectric element made from a lead-free material containing no lead component, or made from lead-containing material.

The droplet ejecting array 27 has a nozzle group including a plurality of nozzles 110 arranged side by side in a X-Y plane that is parallel to the X-direction and the Y-direction, as illustrated in FIG. 5. In the example embodiment described herein, three nozzles 110 are arranged in a vertical direction (also referred to as a first direction), four nozzles 110 are arranged in a horizontal direction (also referred to as a second direction), and one set of twelve nozzles 110 arrayed in three rows and four columns is referred to as a "nozzle group". In other words, in the present embodiment, a plurality of nozzles 110 is arranged in each of the first direction and the second direction as illustrated in FIG. 5. The terminal portion 131c of the lower electrode 131 is spaced from the nozzle group in the first direction, and the terminal portions 131c and other terminal portions 131c for other nozzle groups are aligned in the second direction.

Furthermore, in the droplet ejecting array 27 according to the present embodiment, one nozzle group is located at a position corresponding to one opening 22a of one of the eight solution holding containers 22. In the present embodiment, when the droplet ejecting array 27 is located just above the microplate 4 having 96 holes, one nozzle group is located within one well opening 4b of the microplate 4. Therefore, twelve nozzles 110 in one nozzle group are arranged only within one well opening 4b of the microplate 4.

The diaphragm 120 is formed, for example, integrally with the pressure chamber structure 200. The diaphragm 120 can be formed of a silicon dioxide ($SiO_2$) film on the surface of a silicon wafer 201 using chemical vapor deposition (CVD).

It is desirable that the film thickness of the diaphragm 120 be in the range of 1 μm to 30 μm. The diaphragm 120 can be made of a semiconductor material, such as silicon nitride (SiN), or aluminum oxide ($Al_2O_3$).

The drive element 130 is formed for each nozzle 110. The drive element 130 has an annular shape surrounding the nozzle 110. The shape of the drive element 130 is not limited, and can be, for example, a C-shape formed with a part of the circular ring removed.

The diaphragm 120 deforms in the thickness direction thereof by an operation of the drive element 130, which is in a planar shape. The droplet ejecting device 2 ejects a solution supplied to each nozzle 110 according to a pressure change occurring in a pressure chamber 210 of the pressure chamber structure 200 due to the deformation of the diaphragm 120.

The main body 1A of the droplet dispensing apparatus 1 includes a non-ejection state detection unit 230 illustrated in FIG. 7. The non-ejection state detection unit 230 includes a weight measuring instrument 231, which may be referred to as a scale, weight sensor, or a sensor, using, for example, a crystal oscillator, which detects the weight of the microplate 4.

The weight measuring instrument 231 is connected to a control unit 232, which controls an operation of the droplet ejecting device 2 or an overall operation of the droplet dispensing apparatus 1. Then, a weight of the microplate 4 measured by the weight measuring instrument 231 is input to the control unit 232. A display unit 233 such as a monitor is connected to the control unit 232, and a D curve detection unit 234, which detects a drying decrease curve D, which corresponds to a drying decrease in a solution amount as a function of time, is incorporated in the control unit 232.

The control unit 232 controls ejection processing in which droplets are dropped from the droplet ejecting device 2 onto the microplate 4 according to a flowchart illustrated in FIG. 8. First, in step Act1, an ejection instruction is issued by pressing of a start button (not illustrated) of the droplet dispensing apparatus 1. In step Act2, upon receiving the ejection instruction, the control unit 232 starts ejection processing.

In step Act3, the control unit 232 controls the non-ejection state detection unit 230 to detect whether or not any nozzles in a nozzle group are not ejecting solution as intended. Furthermore, the control unit 232 controls the non-ejection state detection unit 230 according to the flowchart of FIG. 10.

If the control unit 232 does not detect that any nozzles 110 in the nozzle group are not ejecting solution (NO in step Act3), then the control unit 232 normally ends the ejection processing (step Act4).

If the control unit 232 detects that some nozzles 110 in the nozzle group are not ejecting solution (YES in step Act3), then the control unit 232 performs a confirmation control for the amount of non-ejection (step Act5). The amount of non-ejection is detected by, for example, a droplet dropping amount detection unit (not illustrated) of the control unit 232 based on the weight of the microplate measured by the weight measuring instrument 231. If the amount of non-ejection is not confirmed (NO in step Act5), then the control unit 232 displays on the display unit 233 information about a well opening 4b of the microplate 4 corresponding to a nozzle 110 that is not ejecting solution (step Act6).

If the amount of non-ejection is confirmed (YES in step Act5), then the control unit 232 performs an additional operation in which additional droplets are dropped from the droplet ejecting device 2 onto the microplate 4 (step Act7).

In the droplet dispensing apparatus 1 according to the present embodiment, the droplet ejecting array 27 is mounted on the mounting module 5. When the droplet ejecting device 2 is in use, a predetermined amount of solution is supplied to the solution holding container 22 from the top-surface opening portion 22b of the solution holding container 22 by, for example, a pipette or the like (not illustrated). The solution is held in the inner surface of the solution holding container 22. The solution outlet opening 22a at the bottom portion of the solution holding container 22 communicates with the droplet ejecting array 27. The solution held in the solution holding container 22 flows into each pressure chamber 210 of the droplet ejecting array 27 via the solution outlet opening 22a.

A voltage control signal that is input to the control signal input terminal 25 is transmitted from the electrode terminal connector 26 to the terminal portion 131c of the lower electrode 131 and the terminal portions 133c of the upper electrode 133. In response to the voltage control signal applied to the drive element 130, the diaphragm 120 deforms to change the volume of the pressure chamber 210, thus the solution is ejected as solution droplets from the nozzle 110 of the droplet ejecting array 27. In the present embodiment, solution droplets are simultaneously dropped from twelve nozzles 110 to one well opening 4b of the microplate 4. Thus, a predetermined amount of solution is dropped from the nozzles 110 to each well opening 4b of the microplate 4.

An amount of solution that is dropped is controlled by a number of repetitions of one-droplet dropping from each nozzle 110 and thus it is possible to control dropping of solution to each well opening 4b in the order of picoliter (pL) to microliter (μL) to each well opening 4b.

In the present embodiment, the control unit 232 controls the non-ejection state detection unit 230 as illustrated in the flowchart of FIG. 10. First, when a start button (not illustrated) or the like of the droplet dispensing apparatus 1 is pressed, the control unit 232 performs an initial measurement control (step Act11). In the initial measurement control, illustrated in FIG. 9, at time t1 immediately after the start button or the like is pressed, the control unit 232 performs a first droplet dropping operation in which a predetermined amount of droplets are dropped from the droplet ejecting device 2 onto the microplate 4. After the first droplet dropping operation, the control unit 232 acquires an initial weight W0 of the microplate 4 detected by the weight measuring instrument 231 at time t1. FIG. 9 illustrates time variation of the weight of the microplate 4 in consideration of decrease in a solution amount caused by drying after a lapse of a predetermined time from the initial measurement at t1.

In step Act12, before a second droplet dropping operation starts at time t2, the control unit 232 acquires the decrease in a solution amount caused by drying. Here, the control unit 232 acquires weights (W01, W02, W03 . . . ) of the microplate 4 at each of a plurality of setting times (t11, t12, t13 . . . ) from the initial measurement at time t1. Then, the control unit 232 calculates a characteristic curve connecting points W0, W01, W02, W03 . . . , and defines the detected characteristic curve as a drying decrease curve D.

After detecting the drying decrease curve D in step Act12, the control unit 232 proceeds to ejection processing in step Act13. In the ejection processing in step Act13, the control unit 232 performs a second droplet dropping operation at time t2 illustrated in FIG. 9. In FIG. 9, a solid line "e" indicates an expected weight W1 of the weight W of the microplate 4 after a predetermined number of droplets are dropped. During the second droplet dropping operation, the weight W of the microplate 4 decreases due to drying of solution in the microplate 4. Therefore, at the time of the second droplet dropping operation, the weight W21 of solution held in the microplate 4 is less than W0 (W01, W02, W03). The predicted weight W21 is determined according to the drying decrease curve D. Then, the control unit 232 performs the second droplet dropping operation in which droplets are dropped onto the microplate 4 having the weight W21. Therefore, the control unit 232 predicts or estimates that the weight W22 of the microplate 4 at time t2 will be less than W1.

After that, at time t3 after a lapse of a predetermined time from time t2, the weight measuring instrument 231 measures a final weight W32 of the microplate 4. In step Act14, the control unit 232 acquires the measured final weight W32. In step Act15, the control unit 232 determines whether the measured final weight W32 is equal to a predicted weight W31 of the microplate 4 at time t3 which is determined according to the drying decrease curve D. If it is determined that the measured final weight W32 is smaller than the predicted weight W31 (W31 >W32) (YES in step Act15), then in step Act16, the control unit 232 determines that at least one of the nozzles 110 included in the nozzle group is malfunctioning and not ejecting solution as intended. In step Act18, the control unit 232 performs a confirmation control in which an amount of solution that the malfunctioning nozzle(s) would have ejected (also referred to as an amount of non-ejection). The amount of non-ejection is detected by, for example, a droplet dropping amount detection unit (not illustrated) of the control unit 232 based on data weight of the microplate 4 measured by the weight measuring instrument 231. If the amount of non-ejection is not confirmed (NO in step Act18), then in step Act20, the control unit 232 displays on the display unit 233 information about a well opening 4b of the microplate 4 corresponding to a nozzle 110 that is not ejecting solution.

If the amount of non-ejection is confirmed (YES in step Act18), then in step Act19, the control unit 232 performs a supplemental droplet dropping operation in which additional droplets are dropped from the droplet ejecting device 2 onto the microplate 4 to compensate for the amount of non-ejection.

Furthermore, if it is determined that the measured final weight W32 is equal to the predicted weight W31 which is determined according to the drying decrease curve D (NO in step Act15), then in step Act17, the control unit 232 determines that all nozzles 110 in the nozzle group are ejecting solution as intended. The control unit 232 proceeds to step Act21, in which the control unit 232 continues further ejection processing in step Act13 while a predetermined number of droplets have not been dropped into all wells required to receive droplets (NO in step Act21). Upon confirming the predetermined number of droplets have been dropped into all wells required to receive droplets (YES in step Act21), the control unit 232 completes the ejection processing.

In the droplet dispensing apparatus 1 according to the first embodiment, the non-ejection state detection unit 230 is driven at the time of ejection processing in which droplets are dropped from the nozzles 110 of the droplet ejecting array 27 into each well opening 4b of the microplate 4. The control unit 232 detects, via the non-ejection state detection unit 230, a drying decrease in a solution amount based on the weight of the microplate 4 measured by the weight measuring instrument 231. During ejection processing, if the weight (W) of the microplate 4 measured by the weight measuring instrument 231 is smaller than a predicted weight of the microplate 4 after an expected drying decrease in a solution amount in reference to the drying decrease curve D, the control unit 232 determines that at least one of the nozzles 110 included in the nozzle group is malfunctioning and not ejecting solution as intended. Thus, the control unit 232 can detect an ejection failure during ejection processing in which droplets are dropped from the nozzle group of the droplet ejecting array 27 into each well opening 4b of the microplate 4. As a result, when droplets of solution are simultaneously dropped from twelve nozzles 110 of one nozzle group into each well opening 4b of the microplate 4, an ejection failure in which at least one of the twelve nozzles 110 is not ejecting solution can be detected.

When detecting the ejection failure according to the flowchart of FIG. 10, the control unit 232 confirms the amount of non-ejection in step Act18 and, then, performs a supplemental droplet dropping operation in which additional droplets are dropped from the droplet ejecting device 2 onto the microplate 4 in step Act19. If the control unit 232 determines an amount of solution that has been dropped on the microplate 4 during a droplet dropping operation is less than a specified amount of solution based on a weight of the microplate 4 measured by the droplet dropping amount detection unit, the control unit 232 performs a supplemental droplet dropping operation in which additional droplets corresponding to a shortage amount of droplets relative to the specified amount are dropped.

Accordingly, even if a nozzle in a plurality of nozzles 110 of one nozzle group is not ejecting solution during ejection processing in which droplets are dropped from the droplet ejecting device 2 onto the microplate 4, a shortage amount of droplets can be additionally ejected via nozzles 110 that are normally ejecting solution. Therefore, since an intended amount of solution can be dropped from the droplet ejecting array 27 into each well opening 4b of the microplate 4 even when some of the nozzles 110 are malfunctioning, re-execution of an experiment and false evaluation can be prevented.

When a nozzles 110 in a nozzle group are arranged in a×b rows and columns, a number of nozzles 110 in the nozzle group that are not ejecting solution is n, an estimated amount of solution ejected from each nozzle during a one-droplet dropping operation t in picoliter (pL), a number of repetitions of one-droplet dropping operations is X1, and a number of repetitions of supplemental droplet dropping operations is X2, the amount of non-ejection during ejection processing: Y1=t×n×X1, and the amount of additional solution dropped during supplemental droplet dropping operations: Y2=t×(a×b−n)×X2 are obtained. The amount of non-ejection can be compensated for by selecting the number of supplemental droplet dropping operations X2 such that the absolute value of "Y1-Y2" becomes smallest. Since both X1 and X2 are integers, in some cases, Y1=Y2 does not hold. An error obtained in such cases is the absolute value of "Y1-Y2".

Second Embodiment

Figure 11:
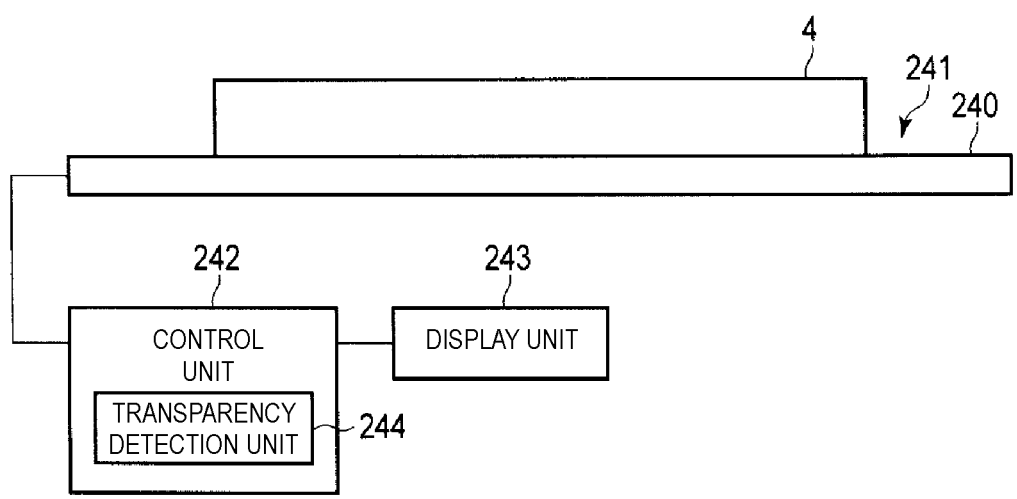
FIG. 11 is a schematic diagram a droplet dispensing apparatus according to a second embodiment.
Figure 12:
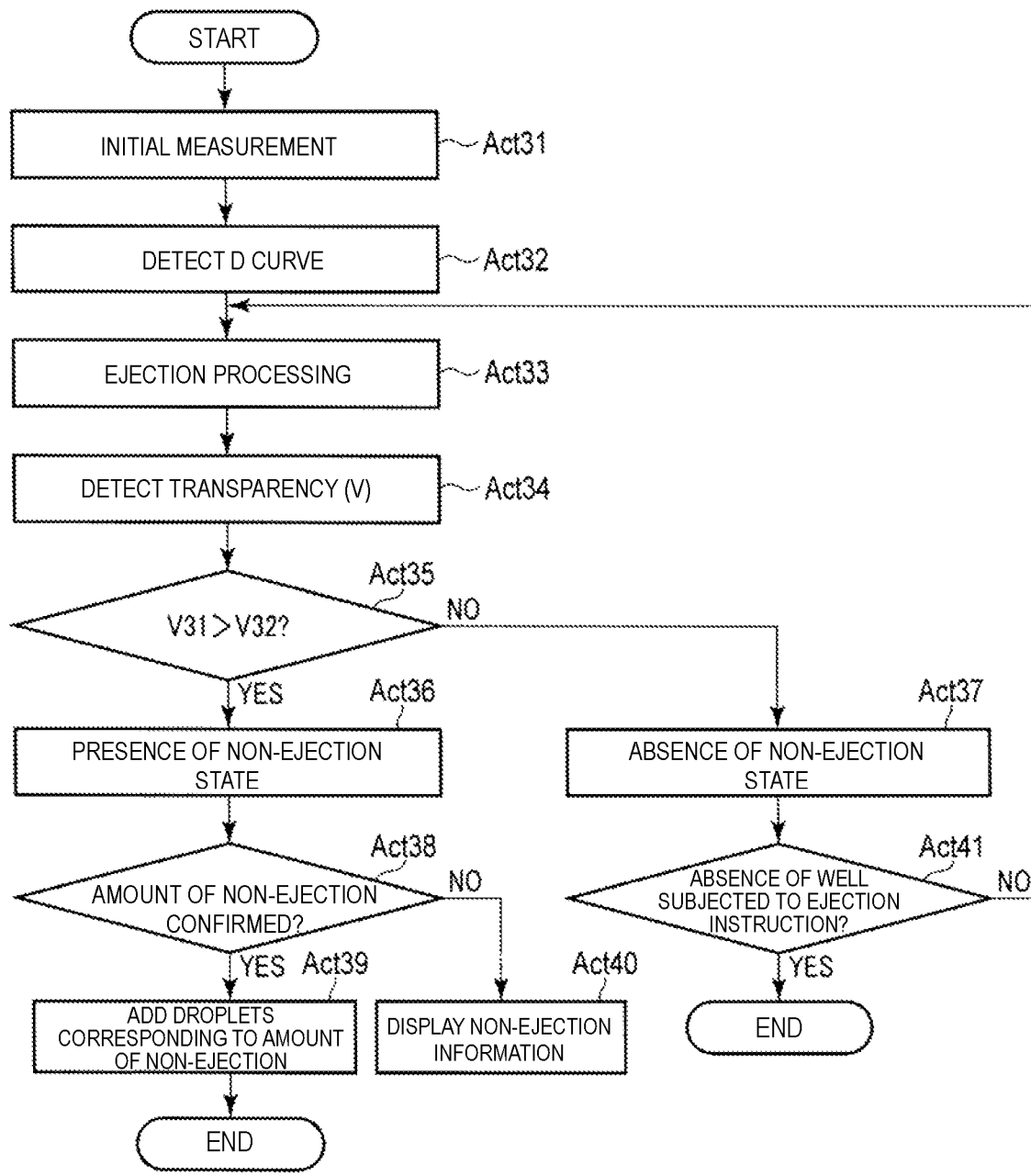
FIG. 12 is a flowchart illustrating an operation of a non-ejection state detection unit of a droplet dispensing apparatus according to the second embodiment.

FIG. 11 and FIG. 12 illustrate a non-ejection state detection unit 241 of the droplet dispensing apparatus 1 according to a second embodiment. In this example embodiment, the non-ejection state detection unit 230 of the droplet dispensing apparatus 1 according to the first embodiment is modified as follows. The same reference numerals are used for the components that are substantially the same as those of the first embodiment, and the detailed description of repeated components may be omitted.

FIG. 11 is a schematic diagram of a non-ejection state detection unit 241 of a droplet dispensing apparatus 1 according to the second embodiment. FIG. 12 is a flowchart illustrating an operation of the non-ejection state detection unit 241 of the droplet dispensing apparatus 1 according to the second embodiment.

In the present embodiment, the non-ejection state detection unit 241 includes a scanner 240, which may be referred to as a transparency sensor or simply a sensor, while in the first embodiment, the non-ejection state detection unit 230 uses the weight measuring instrument 231. The scanner 240 is formed of, for example, a complementary metal-oxide semiconductor (CMOS) sensor, and detects the transparency of the microplate 4.

The scanner 240 is connected to a control unit 242, which controls an operation of the droplet ejecting device 2 or an overall operation of the droplet dispensing apparatus 1. Transparency of the microplate 4 measured by the scanner 240 is input to the control unit 242. A display unit 243 such as a monitor is connected to the control unit 242, and a transparency detection unit 244 which measures the transparency of the microplate 4 is incorporated in the control unit 242. The control unit 242 detects whether or not nozzles 110 of the nozzle group are discharging solution based on the measured transparency by the scanner 240.

As in the first embodiment, the control unit 242 controls ejection processing in which droplets are dropped from the droplet ejecting device 2 of the droplet dispensing apparatus 1 onto the microplate 4 according to the flowchart of FIG. 8.

During the droplet dispensing processing, the control unit 242 performs control of the non-ejection state detection unit 241 illustrated in the flowchart of FIG. 12.

When a start button or the like of the droplet dispensing apparatus 1 is pressed, in step Act31, the control unit 242 performs initial measurement control. In the initial measurement control, at time t1 immediately the start button or the like is pressed, the control unit 242 performs a first droplet dropping operation in which a predetermined amount of droplets are dropped from the droplet ejecting device 2 onto the microplate 4. After the first droplet dropping operation, the control unit 242 acquires an initial transparency v0 of the microplate 4 detected by the scanner 240 at time t1.

In step Act32, the control unit 242 detects a drying decrease curve D, which is similar to the drying decrease curve D in the first embodiment obtained in consideration of the amount of decrease in a solution amount caused by drying of the microplate 4 after a lapse of a predetermined time from the initial actual measurement. Here, the transparency (v) of the microplate 4 becomes less gradually as the solution in the microplate 4 dries.

Before a second droplet dropping operation starts at time t2, the control unit 242 acquires the decrease in a solution amount caused by drying. Here, the control unit 242 acquires transparencies (v) of the microplate 4 at each of a plurality of setting times (t11, t12, t13 . . . ) from the initial measurement at time t1. Then, the control unit 242 calculates a characteristic curve connecting the measured transparencies (v), and defines the detected characteristic curve as a drying decrease curve D.

After detecting the drying decrease curve D, the control unit 242 proceeds to ejection processing in step Act33. In the ejection processing in step Act33, the control unit 242 performs a second droplet dropping operation to drop droplets with a predetermined amount from the droplet ejecting device 2 onto the microplate 4.

During the second droplet dropping operation, the transparency (v) of the microplate 4 decreases due to drying of solution in the microplate 4. At this time, a predicted transparency v32 at time t2 is determined according to the drying decrease curve D. Then, the control unit 242 performs the second droplet dropping operation in which droplets are dropped onto the microplate 4 having the predicted transparency v32 at time t2. The control unit 242 predicts or estimates that the predicted transparency v32 of the microplate 4 at time t2 is less than v0.

After that, at time t3 after a lapse of a predetermined time from time t2, in step Act34, the control unit 242 acquires an final transparency v32 of the microplate 4 measured by the scanner 240. In step Act35, the control unit 242 determines whether the measured final weight v32 is equal to a predicted transparency v31 of the microplate 4 which is determined according to the drying decrease curve D. If it is determined that the measured final transparency v32 is smaller than the predicted transparency v31 (v31>v32) (YES in step Act35), then in step Act36, the control unit 242 determines that at least one of the nozzles 110 included in the nozzle group is malfunctioning and not ejecting solution as intended. In step Act39, the control unit 242 performs a supplemental droplet dropping operation in which additional droplets corresponding to the amount of non-ejection are dropped onto the microplate 4. Furthermore, if it is determined that the measured final transparency v32 is equal to the predicted transparency v31 which is determined according to the drying decrease curve D (NO in step Act35), then in step Act37, the control unit 242 determines that all nozzles 110 in the nozzle group are ejecting solution as intended. The control unit 242 proceeds to step Act41, in which the control unit 242 continues further ejection processing in step Act33 while a predetermined number of droplets have not been dropped into all wells required to receive droplets (NO in step Act41). Upon confirming the predetermined number of droplets have been dropped into all wells required to receive droplets (YES in step Act41), the control unit 242 completes the ejection processing.

In the droplet dispensing apparatus 1 according to the second embodiment, the control unit 242 acquires a drying decrease of droplets based on the transparency (v) of the microplate 4 measured by the scanner 240. During ejection processing, if the transparency (v) of the microplate 4 measured by the scanner 240 is smaller than the predicted transparency (v) of the microplate 4 after an expected drying decrease in a solution amount in reference to the drying decrease curve D, the control unit 242 determines that at least one of the nozzles 110 included in the nozzle group is malfunctioning and not ejecting solution as intended. Thus, the control unit 242 can detect an ejection failure during ejection processing in which droplets are dropped from the nozzle group of the droplet ejecting array 27 into each well opening 4b of the microplate 4.

When detecting the ejection failure according to the flowchart of FIG. 12, the control unit 242 confirms the amount of non-ejection in step Act38 and, then, performs a supplemental droplet dropping operation in which additional droplets are dropped from the droplet ejecting device 2 onto the microplate 4 in step Act39. The control unit 242 performs a supplemental droplet dropping operation in which additional droplets corresponding to a shortage amount relative to the specified amount are dropped.

Accordingly, even if a nozzle in a plurality of nozzles 110 of one nozzle group is not ejecting solution during ejection processing in which droplets are dropped from the droplet ejecting device 2 onto the microplate 4, a shortage amount of droplets can be additionally ejected. Therefore, since an intended amount of solution can be dropped from the droplet ejecting array 27 into each well opening 4b of the microplate 4 even when some of the nozzles 110 are malfunctioning, re-execution of an experiment and false evaluation can be prevented.

Third Embodiment

Figure 13:
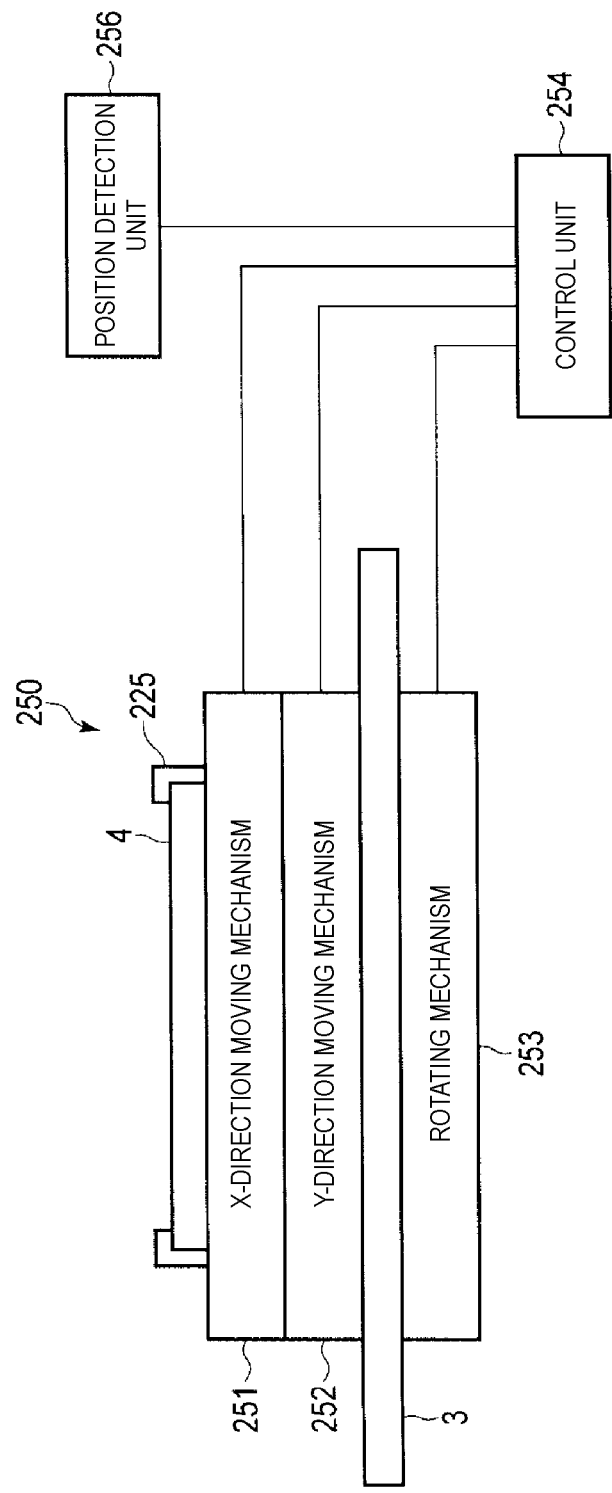
FIG. 13 is a schematic diagram of a control unit of a droplet dispensing apparatus according to a third embodiment.
Figure 14:
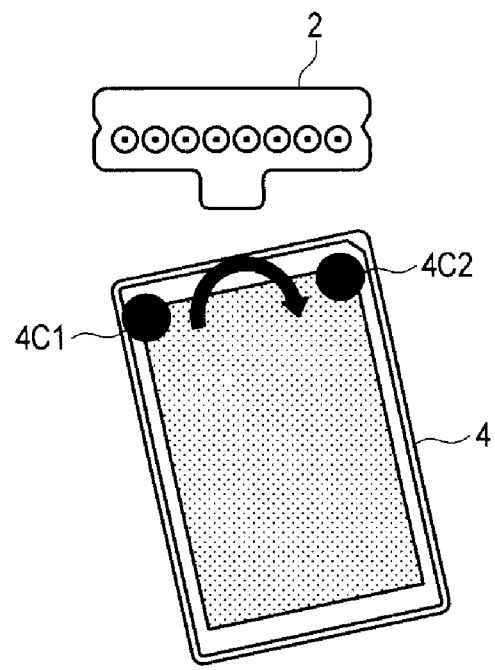
FIG. 14 is a diagram for explaining a positioning operation fora droplet dispensing apparatus according to the third embodiment.

FIG. 13 and FIG. 14 illustrate a droplet dispensing apparatus 1 according to a third embodiment. In this example embodiment, the droplet dispensing apparatus 1 according to the first embodiment is modified. The same reference numerals are used for the components that are substantially the same as those of the first embodiment, and the detailed description of repeated components may be omitted.

FIG. 13 is a schematic diagram of a control unit 254 of a droplet dispensing apparatus 1 according to the third embodiment. FIG. 14 is a diagram for explaining a positioning operation of the droplet dispensing apparatus 1 according to the third embodiment.

In the present embodiment, the main body 1A of the droplet dispensing apparatus 1 includes a position correction device 250 illustrated in FIG. 13. The position correction device 250 includes an X-direction moving mechanism 251, a Y-direction moving mechanism 252, a rotating mechanism 253, the control unit 254, and a position detection unit 256. The Y-direction moving mechanism 252 is located at the side of the upper surface of the baseplate 3 of the main body 1A. The Y-direction moving mechanism 252 includes a moving plate which is movable in the Y-direction relative to the baseplate 3. The X-direction moving mechanism 251 is located on the Y-direction moving mechanism 252 and includes a moving plate which is movable in the X-direction, which is perpendicular to the Y-direction. A plate attaching portion 255, which can be secured and detached from the microplate 4 is provided on the X-direction moving mechanism 251.

The rotating mechanism 253 is located on the underside of the baseplate 3, and drives the entire baseplate 3 to rotate around a rotational shaft (not illustrated) provided in an extending manner in the vertical direction. The position detection unit 256 includes, for example, a scanner 240 as shown in FIG. 11, and detects the position of the microplate 4 by the scanner 240. The X-direction moving mechanism 251, the Y-direction moving mechanism 252, the rotating mechanism 253, and the position detection unit 256 are connected to the control unit 254.

The position correction device 250 is driven at the time of a droplet dropping operation. The position correction device 250 can adjust a position of the microplate 4 nozzles 110 of the droplet ejecting device 2 before the ejection processing is started.

At the time of driving of the position correction device 250, the position detection unit 256 detects the position of the microplate 4. The scanner 240 detects the positions of left and right corner portions 4C1 and 4C2 of the microplate 4 as illustrated in FIG. 14. Detected positions are input to the control unit 254. The control unit 254 drives each of the X-direction moving mechanism 251, the Y-direction moving mechanism 252, and the rotating mechanism 253 of the position correction device 250 based on the detected position as to align the microplate 4 with respect to nozzles 110 of the droplet ejecting device 2.

Therefore, in the present embodiment, the position correction device 250 is driven at the time of starting of the droplet dispensing apparatus 1. Then, a positional deviation of the microplate 4 relative to the nozzles 110 of the droplet ejecting device 2 can be corrected before ejection processing is started. Automatic position adjustment of the microplate 4 relative to the nozzles 110 of the droplet ejecting device 2 prevents a solution ejection error. That is, when droplets are ejected to a high-density microplate 4, solution can prevent from being ejected to a neighboring well opening 4b due to a positional deviation of the microplate 4, and thus errors in final evaluation results or false performance evaluation of performance can be prevented.

Furthermore, in the example embodiment described above, a positional deviation of the microplate 4 relative to nozzles 110 is corrected at the beginning of ejection processing. A positional deviation of the microplate 4 can be automatically corrected during the ejection processing.

Fourth Embodiment

Figure 15:
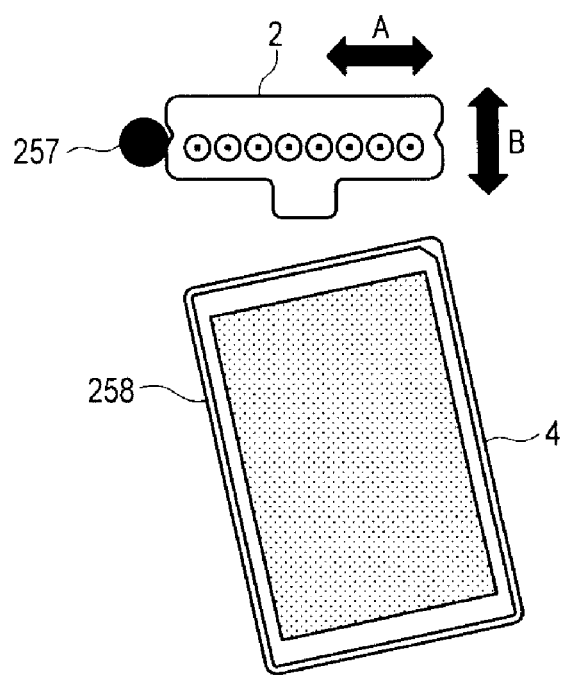
FIG. 15 is a diagram for explaining a positioning operation of a droplet dispensing apparatus according to a fourth embodiment.

FIG. 15 illustrates a droplet dispensing apparatus 1 according to a fourth embodiment. In this example embodiment, the droplet dispensing apparatus 1 according to the third embodiment is modified as follows. The same reference numerals are used for the components that are substantially the same as those of the third embodiment, and the detailed description of repeated components may be omitted.

As illustrated in FIG. 15, a position sensor 257 according to the fifth embodiment is provided at one end of the droplet ejecting device 2. The position sensor 257 detects the position of a side edge portion 258 of the microplate 4. The droplet ejecting device 2 is moved in the direction of arrow A and in the direction of arrow B perpendicular to the direction of arrow A in reference to the side edge portion 258 of the microplate 4. This enables correcting a positional deviation of the microplate 4 relative to nozzles 110 of the droplet ejecting device 2. Automatic positional adjustment of the microplate 4 relative to nozzles 110 of the droplet ejecting device 2 prevents a solution ejection error. That is, when droplets are ejected onto a high-density microplate 4, solution can be prevented from being ejected into a neighboring well opening 4b due to a positional deviation of the microplate 4, and thus errors in final evaluation results or false performance evaluation of drug can be prevented.

Fifth Embodiment

Figure 16:
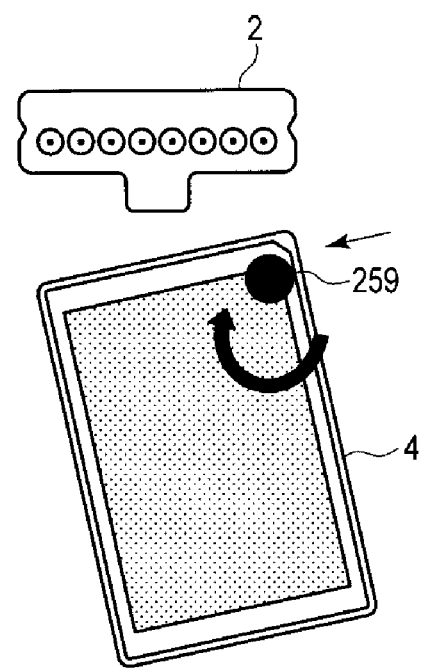
FIG. 16 is a diagram for explaining a positioning operation of a droplet dispensing apparatus according to a fifth embodiment.

FIG. 16 illustrates a droplet dispensing apparatus 1 according to a fifth embodiment. In this example embodiment, the droplet dispensing apparatus 1 according to the third embodiment is modified as follows. The same reference numerals are used for the components that are substantially the same as those of the third embodiment, and the detailed description of repeated components may be omitted.

As illustrated in FIG. 16, the position detection unit 256 detects the position of the microplate 4. The position detection unit 256 according to the fifth embodiment detects the position of an upper right corner portion 259 of the microplate 4 as illustrated in FIG. 16. Detected position of the upper right corner portion 259 of the microplate 4 is input to the control unit 254. The control unit 254 drives each of the X-direction moving mechanism 251, the Y-direction moving mechanism 252, and the rotating mechanism 253 of the position correction device 250 based on the detected positions as to correct align the microplate 4 with respect to nozzles 110 of the droplet ejecting device 2.

This enables correcting a positional deviation of the microplate 4 relative to nozzles 110 of the droplet ejecting device 2. Automatic positional adjustment of the microplate 4 relative to nozzles 110 of the droplet ejecting device 2 prevents a solution ejection error. That is, when droplets are ejected onto a high-density microplate 4, solution can be prevented from being ejected into a neighboring well opening 4b due to a positional deviation of the microplate 4, and thus errors in final evaluation results or false performance evaluation of drug can be prevented.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A droplet dispensing apparatus, comprising:
    a droplet ejecting array having a plurality of nozzles from which solution can be ejected into a microplate on a baseplate;
    a sensor configured to detect a solution amount in the microplate on the base plate; and
    a controller connected to the droplet ejecting array and the sensor, the controller configured to:
        receive an ejection instruction for a solution ejection process in which an intended final solution amount in the microplate on the base plate is set;
        control the droplet ejection array to perform the solution ejection process according to the ejection instruction;
        detect that a nozzle in the plurality of nozzles is malfunctioning during a in the solution ejection process based on an initial solution amount in the microplate as detected by the sensor and a final solution amount in the microplate as detected by the sensor at the end of the solution ejection process,
        calculate an additional solution amount if the nozzle is detected as malfunctioning, the additional solution amount being an amount of solution to be ejected from the droplet ejecting array to compensate for the malfunctioning of the nozzle during the solution ejection process, and
        control the droplet ejecting array to perform a supplemental droplet dispensing operation to eject the calculated additional solution amount from the droplet ejecting array into the microplate.

2. The droplet dispensing apparatus according to claim 1, wherein
    the controller is further configured to calculate the additional solution amount as a difference between the intended final solution amount and the final solution amount.

3. The droplet dispensing apparatus according to claim 1, wherein
    the sensor is a scale configured to weigh the microplate while the microplate is on the baseplate, and
    the controller is further configured to:
        calculate an expected weight decrease due to drying during the solution ejection process based on an initial weight of the microplate on the baseplate and a reference weight of the microplate on the baseplate as measured after a predetermined time after the initial weight is measured, and
        output a signal indicating that at least one nozzle in the plurality of nozzles is malfunctioning if a final weight of the microplate is less than the initial weight plus any expected weight increase due to droplets ejected during the solution ejection process minus the expected weight decrease due to drying.

4. The droplet dispensing apparatus according to claim 1, wherein
    the sensor is a scanner configured to measure a transparency of the microplate, and
    the controller is further configured to:
        calculate an expected transparency change due to drying during the solution ejection process based on an initial transparency of the microplate as measured by the sensor and a reference transparency of the microplate as measured by the sensor after a predetermined time after the initial transparency is measured, and
        output a signal indicating that at least one nozzle in the plurality of nozzles is malfunctioning if a final transparency of the microplate is different from the initial transparency plus any expected transparency change due to droplets ejected during the solution ejection process plus the expected transparency change due to drying.

5. The droplet dispensing apparatus according to claim 1, wherein
    when the plurality of nozzles is arranged in a×b rows and columns, a number of nozzles that are not discharging is n, an estimated amount of solution ejected from each nozzle during a one-droplet dispensing operation is t, a number of repetitions of the one-droplet dispensing operation is X1, and a number of repetitions of a supplemental droplet dispensing operation is X2,
    an amount of non-ejection during the solution ejection process is Y1 and Y1 is equal to t×n×X1,
    an amount of addition solution to be dropped during the supplemental droplet dispensing operation is Y2 and Y2 is equal to t×(a×b−n)×X2, and
    the controller is configured to select the value for X2 such that the difference between Y1 and Y2 is minimized.

6. A droplet dispensing apparatus, comprising:
    a baseplate on which a microplate can be disposed;
    a droplet ejection array having a plurality of nozzles from which droplets can be ejected into the microplate on the baseplate;
    a movement mechanism attached to baseplate and the droplet ejection array and configured to move the droplet ejection array such that droplets can be ejected into each well of the microplate;
    a sensor configured to detect a solution amount in the microplate; and
    a controller connected to the droplet ejection array and the sensor, the controller configured to:
        receive an ejection instruction for a solution ejection process in which an intended final solution amount in the microplate on the base plate is set;
        control the droplet ejection array to perform the solution ejection process according to the ejection instruction;
        detect that a nozzle in the plurality of nozzles is malfunctioning in the solution ejection process based on an initial solution amount in the microplate as detected by the sensor and a final solution amount in the microplate as detected by the sensor at the end of the solution ejection process, calculate an additional solution amount if the nozzle is detected as malfunctioning, the additional solution amount being an amount of solution to be ejected from the droplet ejecting array to compensate for the malfunctioning of the nozzle during the solution ejection process, and control the droplet ejecting array to perform a supplemental droplet dispensing operation to eject the calculated additional solution amount from the droplet ejecting array into the microplate.

7. The droplet dispensing apparatus according to claim 6, wherein the controller is further configured to calculate the additional solution amount as a difference between the intended solution amount and the final solution amount.

8. The droplet dispensing apparatus according to claim 6, wherein
the sensor is a scale configured to weigh the microplate while the microplate is on the baseplate, and
the controller is further configured to:
calculate an expected weight decrease due to drying during the solution ejection process based on an initial weight of the microplate on the baseplate and a reference weight of the microplate on the baseplate as measured by the sensor after a predetermined time after the initial weight is measured by the sensor, and
output a signal indicating that at least one nozzle in the plurality of nozzles is malfunctioning if a final weight of the microplate is less than the initial weight plus any expected weight increase due to droplets ejected during the solution ejection process minus the expected weight decrease due to drying.

9. The droplet dispensing apparatus according to claim 6, wherein
the sensor is a scanner configured to measure a transparency of the microplate, and
the controller is further configured to:
calculate an expected transparency change due to drying during the solution ejection process based on an initial transparency of the microplate as measured by the sensor and a reference transparency of the microplate as measured by the sensor after a predetermined time after the initial transparency is measured, and
output a signal indicating that at least one nozzle in the plurality of nozzles is malfunctioning if a final transparency of the microplate is different from the initial transparency plus any expected transparency change due to droplets ejected during the solution ejection process plus the expected transparency change due to drying.

10. The droplet dispensing apparatus according to claim 6, wherein
when the plurality of nozzles is arranged in a×b rows and columns, a number of nozzles that are not discharging is n, an estimated amount of solution ejected from each nozzle during a one-droplet dispensing operation is t, a number of repetitions of the one-droplet dispensing operation is X1, and a number of repetitions of a supplemental droplet dispensing operation is X2,
an amount of non-ejection during the solution ejection process is Y1 and Y1 is equal to t×n×X1,
an amount of addition solution to be dropped ejected during the supplemental droplet dispensing operation is Y2 and Y2 is equal to t×(a×b−n)×X2, and
the controller is configured to select the value for X2 such that the difference between Y1 and Y2 is minimized.

11. The droplet dispensing apparatus according to claim 6, wherein the moving mechanism comprises:
a first-direction moving mechanism on which the microplate is placed, the first-direction moving mechanism being configured to move in a first direction in a plane parallel to the baseplate;
a second-direction moving mechanism on the baseplate, the second-direction moving mechanism being configured to move in a second direction that is perpendicular to the first direction in the plane parallel to the baseplate; and
a rotating mechanism supporting the baseplate, the rotating mechanism being configured to rotate the baseplate around a third direction that is perpendicular to the first direction and the second direction.

12. The droplet dispensing apparatus according to claim 11, further comprising:
a position sensor at an end of the droplet ejecting array, the position sensor being configured to detect a side edge portion of the microplate, wherein
the controller controls the moving mechanism to adjust a position of the microplate to be aligned with the droplet ejecting array based on a position of the side edge portion of the microplate detected by the position sensor.

13. The droplet dispensing apparatus according to claim 11, further comprising:
a position sensor at an end of the droplet ejecting array, the position sensor being configured to detect a corner portion of the microplate, wherein
the controller controls the moving mechanism to adjust a position of the microplate to be aligned with the droplet ejecting array based on a position of the corner portion of the microplate detected by the position sensor.

14. A droplet dispensing apparatus comprising:
a baseplate on which a microplate can be disposed;
a droplet ejection array having a plurality of nozzles from which droplets can be ejected into the microplate on the baseplate;
a movement mechanism attached to baseplate and the droplet ejection array and configured to move the droplet ejection array such that droplets can be ejected into each well of the microplate;
a scale configured to measure a weight of the microplate while on the baseplate; and
a controller connected to the droplet ejection array and the scale, the controller configured to:
receive an ejection instruction for a solution ejection process in which an intended final solution amount in the microplate on the base plate is set;
control the droplet ejection array to perform the solution ejection process according to the ejection instruction;
detect that a nozzle in the plurality of nozzles is malfunctioning in the solution ejection process based on an initial solution amount in the microplate as measured by the scale and a final solution amount in the microplate as measured by the scale at the end of the solution ejection process,
calculate an additional solution amount if the nozzle is detected as malfunctioning, the additional solution amount being an amount of solution to be ejected from the droplet ejecting array to compensate for the malfunctioning of the nozzle during the solution ejection process, and
control the droplet ejecting array to perform a supplemental droplet dispensing operation to eject the calculated additional solution amount from the droplet ejecting array into the microplate.

15. The droplet dispensing apparatus according to claim 14, wherein
the controller is further configured to calculate the additional solution amount as a difference between the intended solution amount and the final solution amount.

16. The droplet dispensing apparatus according to claim 14, wherein
the controller is further configured to:
calculate an expected weight decrease due to drying during the solution ejection process based on an initial weight of the microplate on the baseplate as measured by the scale and a reference weight of the microplate on the baseplate as measured by the scale after a predetermined time after the initial weight is measured, and
output a signal indicating at least one nozzle in the plurality of nozzles is malfunctioning if a final weight of the microplate is less than the initial weight plus any expected weight increase due to droplets ejected during the solution ejection process minus the expected weight reduction due to drying.

17. The droplet dispensing apparatus according to claim 14, wherein
when the plurality of nozzles is arranged in a×b rows and columns, a number of nozzles that are not discharging is n, an estimated amount of solution ejected from each nozzle during a one-droplet dispensing operation is t, a number of repetitions of the one-droplet dispensing operation is X1, and a number of repetitions of a supplemental droplet dispensing operation is X2,
an amount of non-ejection during the solution ejection processing is Y1 and Y1 is equal to t×n×X1,
an amount of addition solution to be elected during the supplemental droplet dispensing operation is Y2 and Y2 is equal t×(a×b—n)×X2, and
the controller is configured to select the value for X2 such that the difference between Y1 and Y2 is minimized.

18. The droplet dispensing apparatus according to claim 14, wherein the moving mechanism comprises:
a first-direction moving mechanism on which the microplate is placed, the first-direction moving mechanism being configured to move in a first direction in a plane parallel to the baseplate;
a second-direction moving mechanism on the baseplate, the second-direction moving mechanism being configured to move in a second direction that is perpendicular to the first direction in the plane parallel to the baseplate; and
a rotating mechanism supporting the baseplate, the rotating mechanism being configured to rotate the baseplate around a third direction that is perpendicular to the first direction and the second direction.

19. The droplet dispensing apparatus according to claim 14, further comprising:
a position sensor at an end of the droplet ejecting array, the position sensor being configured to detect a side edge portion of the microplate, wherein
the controller controls the moving mechanism to adjust a position of the microplate to be aligned with the droplet ejecting array based on a position of the side edge portion of the microplate detected by the position sensor.

20. The droplet dispensing apparatus according to claim 14, further comprising:
a position sensor at an end of the droplet ejecting array, the position sensor being configured to detect a corner portion of the microplate, wherein
the controller controls the moving mechanism to adjust a position of the microplate to be aligned with the droplet ejecting array based on a position of the corner portion of the microplate detected by the position sensor.

* * * * *

UNITED STATES PATENT AND TRADEMARK OFFICE
CERTIFICATE OF CORRECTION

PATENT NO. : 11,213,813 B2
APPLICATION NO. : 15/891166
DATED : January 4, 2022
INVENTOR(S) : Masaaki Higuchi, Satoshi Kaiho and Ryutaro Kusunoki It is certified that error appears in the above-identified patent and that said Letters Patent is hereby corrected as shown below:

In the Claims

Column 13, Claim 1, Line 36, delete "during a".

Column 15, Claim 10, Line 63, delete "dropped".

Column 17, Claim 17, Line 35, replace "elected" with "ejected".

Signed and Sealed this
Fifteenth Day of November, 2022

Katherine Kelly Vidal
*Director of the United States Patent and Trademark Office*